US012432167B2

(12) United States Patent
Puyol et al.

(10) Patent No.: US 12,432,167 B2
(45) Date of Patent: Sep. 30, 2025

(54) TRANSMITTING THREE-DIMENSIONAL OBJECTS VIA MESSENGER

(71) Applicant: Meta Platforms Technologies, LLC, Menlo Park, CA (US)

(72) Inventors: Ana Garcia Puyol, Mountain View, CA (US); Camila Cortes De Almeida e De Vincenzo, Seattle, WA (US); Paul Armistead Hoover, Bothell, WA (US); Jenna Velez, Seattle, WA (US); Sangwoo Han, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/495,904

(22) Filed: Oct. 27, 2023

(65) Prior Publication Data

US 2024/0146675 A1    May 2, 2024

Related U.S. Application Data

(60) Provisional application No. 63/381,516, filed on Oct. 28, 2022.

(51) Int. Cl.
*H04L 51/10* (2022.01)
*G02B 27/01* (2006.01)
*G06T 19/00* (2011.01)
*H04L 51/224* (2022.01)

(52) U.S. Cl.
CPC .......... *H04L 51/10* (2013.01); *G02B 27/017* (2013.01); *G06T 19/006* (2013.01); *H04L 51/224* (2022.05)

(58) Field of Classification Search
CPC ......... H04L 51/00; H04L 51/04; H04L 51/10; H04L 51/046; H04L 51/224; H04L 67/131; H04N 7/157; G02B 27/017; G06T 19/006; G06T 13/20; G06T 13/40; G06T 19/20; G06F 3/011; G06F 3/04815; G06F 3/04845

See application file for complete search history.

(56) References Cited

U.S. PATENT DOCUMENTS

| 10,380,800 | B2 | 8/2019 | Smith et al. |
| 10,712,814 | B2 | 7/2020 | Webb et al. |
| 10,872,322 | B2 | 12/2020 | Siddique et al. |
| 2013/0201215 | A1 | 8/2013 | Martellaro et al. |
| 2018/0095636 | A1* | 4/2018 | Valdivia ................. G06F 3/011 |
| 2019/0018656 | A1 | 1/2019 | Monsarrat et al. |
| 2019/0275434 | A1* | 9/2019 | Chandrasekaran ..... A63F 13/87 |

(Continued)

OTHER PUBLICATIONS

ARkit, "Creating a Multiuser AR Experience," Apple Developer, 2022, 5 pages, Retrieved from the Internet: URL: https://developer.apple.com/documentation/arkit/creating_a_multiuser_ar_experience.

(Continued)

*Primary Examiner* — Johnny B Aguiar
(74) *Attorney, Agent, or Firm* — Morgan, Lewis & Bockius LLP

(57) ABSTRACT

Methods, systems, and storage media for transmitting three-dimensional (3D) objects via messaging applications are disclosed. Exemplary implementations may: receive, at a first device running a messaging application, a message from a second device; import the 3D object to a personal account of a user of the first device; and display the 3D object in the messaging application.

19 Claims, 10 Drawing Sheets

(56) References Cited

U.S. PATENT DOCUMENTS

| | | |
|---|---|---|
| 2019/0287307 A1 | 9/2019 | Rogers et al. |
| 2019/0318065 A1 | 10/2019 | Brent et al. |
| 2021/0304506 A1* | 9/2021 | Mourkogiannis ....... G06T 17/20 |
| 2021/0358215 A1* | 11/2021 | Cowburn ................ G06F 3/017 |
| 2022/0284682 A1* | 9/2022 | Goodrich ................. G06T 7/50 |
| 2023/0106201 A1* | 4/2023 | Liu ......................... H04N 5/91 |
| | | 345/419 |
| 2023/0298247 A1* | 9/2023 | Tham .................... H04N 23/90 |
| | | 345/633 |
| 2023/0410440 A1* | 12/2023 | Boroujerdi ............. H04L 51/10 |

OTHER PUBLICATIONS

Meta Platforms Technologies, LLC, ISR/WO, PCT/US2022/043913, Jan. 9, 2023, 10 pgs.

* cited by examiner

TRANSMITTING THREE-DIMENSIONAL OBJECTS VIA MESSENGER

TECHNICAL FIELD

The present disclosure generally relates to sharing virtual objects, and more particularly to sharing three-dimensional (3D) objects via messaging applications.

BACKGROUND

Conventionally, artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality.

BRIEF SUMMARY

The subject disclosure provides for systems and methods for sharing virtual objects. A user is allowed to share virtual objects with other users. For example, virtual objects may be shared in artificial reality environments through messaging applications.

One aspect of the present disclosure relates to a method for transmitting 3D objects via messaging application. The method may include receiving, at a first device running a messaging application, a message from a second device. The message may include a three-dimensional object. The method may include importing the 3D object to a personal account of a user of the first device. The method may include displaying the 3D object in the messaging application. The user may interact with the 3D object at the first device.

Another aspect of the present disclosure relates to a system configured for transmitting 3D objects via messaging application. The system may include one or more hardware processors configured by machine-readable instructions. The processor(s) may be configured to receive, at a first device running a messaging application, a message from a second device. The message may include a three-dimensional object. The processor(s) may be configured to import the 3D object to a personal account of a user of the first device. The processor(s) may be configured to display the 3D object in the messaging application. The user may interact with the 3D object at the first device.

Yet another aspect of the present disclosure relates to a non-transient computer-readable storage medium having instructions embodied thereon, the instructions being executable by one or more processors to perform a method for transmitting 3D objects via messaging application. The method may include receiving, at a first device running a messaging application, a message from a second device. The message may include a three-dimensional object. The method may include importing the 3D object to a personal account of a user of the first device. The method may include displaying the 3D object in the messaging application. The user may interact with the 3D object at the first device.

Still another aspect of the present disclosure relates to a system configured for transmitting 3D objects via messaging application. The system may include means for receiving, at a first device running a messaging application, a message from a second device. The message may include a three-dimensional object. The system may include means for importing the 3D object to a personal account of a user of the first device. The system may include means for displaying the 3D object in the messaging application. The user may interact with the 3D object at the first device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
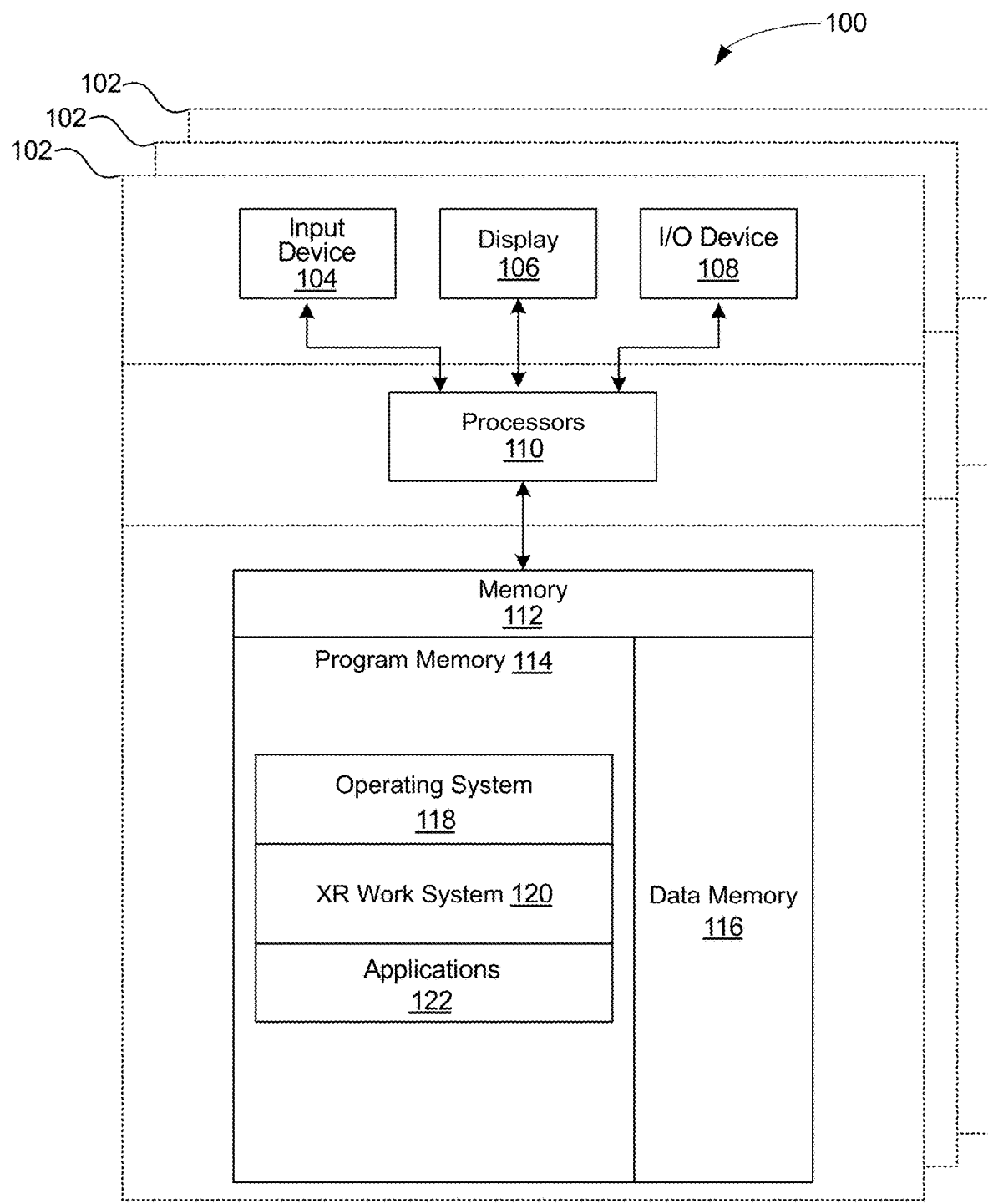
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform cap able of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a user's eye is partially generated by a computing system and partially composes light reflected off objects in the real-world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., gaming artificial reality environment) such as for individually control of audio (e.g., switching audio sources) via XR elements and/or real world audio elements. The interaction modes can include different audio sources or channels for each user of the computing system 100. Some of these audio channels may be spatialized or non-spatialized. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations one or more of the non-headset computing devices 102 can include sensor components that can track environment or position data, such as for implementing computer vision functionality. Additionally, such sensors can be incorporated as wrist sensors, which can function as a wrist wearable for detecting or determining user input gestures. For example, the sensors may include inertial measurement units (IMUs), eye tracking sensors, electromyography (e.g., for translating neuromuscular signals to specific gestures), time of flight sensors, light/optical sensors, and/or the like to determine the inputs gestures, how user hands/wrists are moving, and/or environment and position data.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102). The computing system 100 can include one or more input devices 104 that provide input to the processors 110, notifying them of actions. The actions can be mediated by a hardware controller that interprets the signals received from the input device 104 and communicates the information to the processors 110 using a communication protocol. As an example, the hardware controller can translate signals from the input devices 104 to render audio, motion, or other signal controlled features in the shared XR environment. Each input device 104 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a Peripheral Component Interconnect (PCI) bus, Small Computer System Interface (SCSI) bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices include a liquid-crystal display (LCD) display screen, an-a light-emitting diode (LED) display screen, a projected, holographic, or augmented reality display (such as a heads-up display device or a head-mounted device), and/or the like. Other input/output (I/O) devices 108 can also be coupled to the processor, such as a network chip or card, video chip or card, audio chip or card, universal serial bus (USB), firewire or other external device, camera, printer, speakers, compact disc read-only memory (CD-ROM) drive, digital versatile disc (DVD) drive, disk drive, etc.

The computing system 100 can include a communication device capable of communicating wirelessly or wire-based with other local computing devices 102 or a network node. The communication device can communicate with another device or a server through a network using, for example, Transmission Control Protocol/Internet Protocol (TCP/IP). The computing system 100 can utilize the communication device to distribute operations across multiple network devices. For example, the communication device can function as a communication module. The communication device can be configured to transmit or receive audio signals.

The processors 110 can have access to a memory 112, which can be contained on one of the computing devices 102 of the computing system 100 or can be distributed across one of the multiple computing devices 102 of the computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2A:
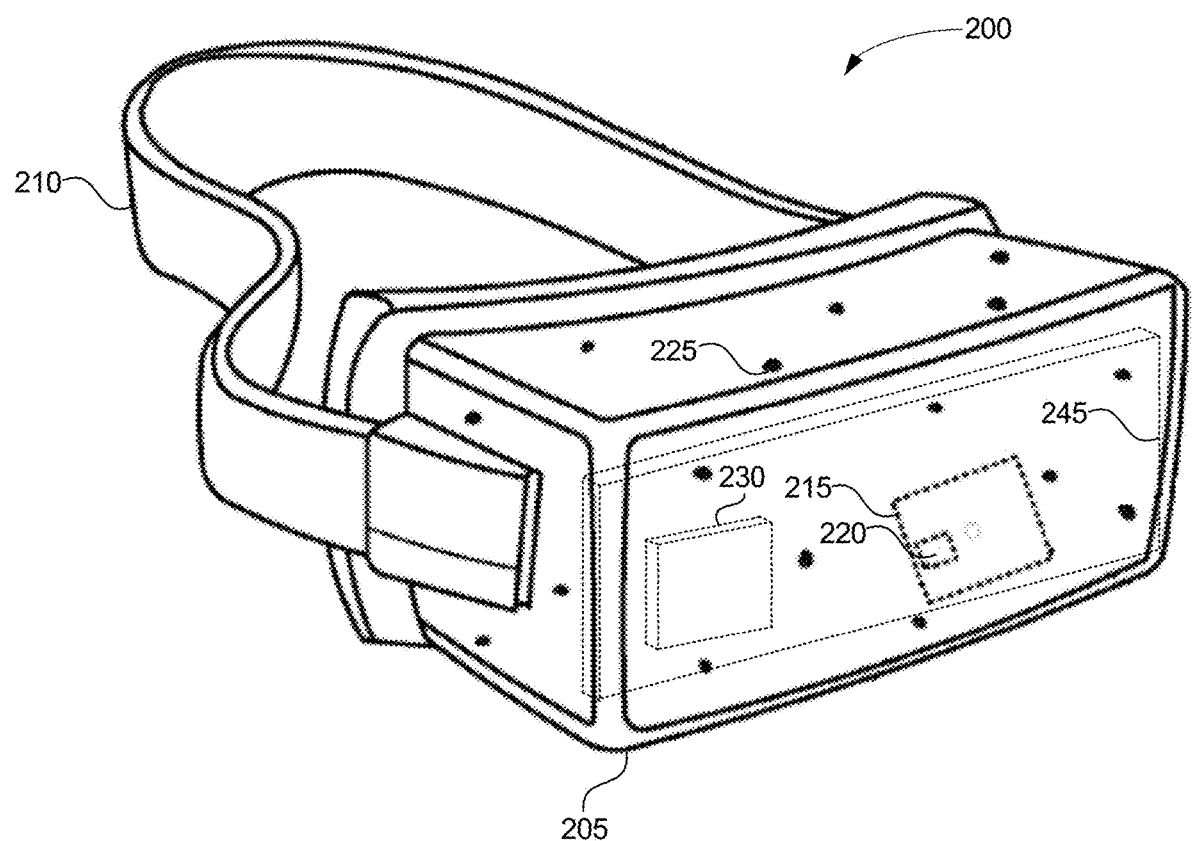
FIG. 2A is a wire diagram of a virtual reality head-mounted display (HMD), in accordance with one or more implementations.
Figure 2B:
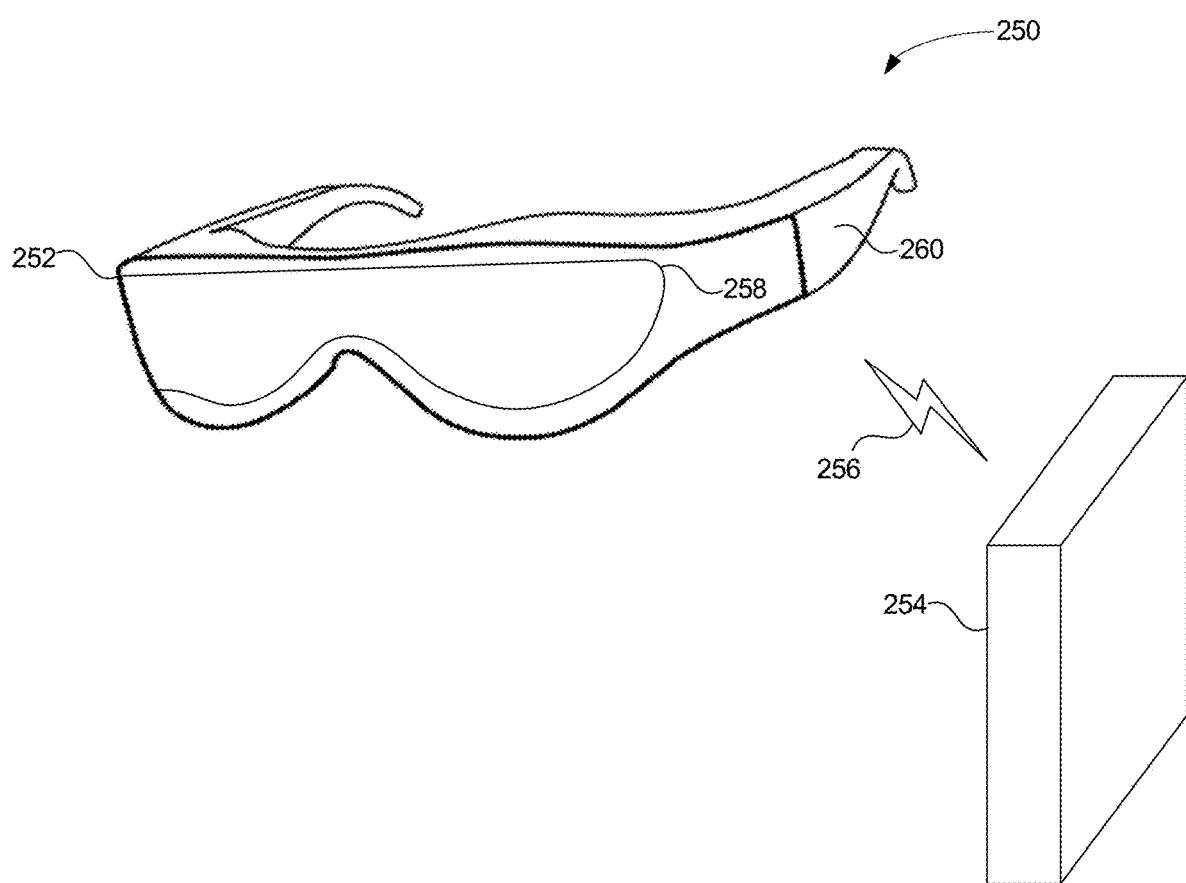
FIG. 2B is a wire diagram of a mixed reality HMD system which includes a mixed reality HMD and a core processing component, in accordance with one or more implementations.

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF), six degrees of freedom (6DoF), etc. For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200 (e.g., hand gestures performed by the user wearing the HMD 200).

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof. The electronic display 245 can be coupled with an audio component, such as send and receive output from various other users of the XR environment wearing their own XR headsets, for example. The audio component can be configured to host multiple audio channels, sources, or modes.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 gigahertz (GHz) link) as indicated by the link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, micro-electromechanical systems (MEMS) components, networking components, etc. The frame 260 or another part of the mixed reality HMD 252 may include an audio electronic component such as a speaker. The speaker can output audio from various audio sources, such as a phone call, Voice over Internet Protocol (VOIP) session, or other audio channel. The electronic components may be configured to implement audio switching based on user gaming or XR interactions.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects. For example, the HMD system 250 can track the motion and position of user's wrist movements as input gestures for performing XR navigation. As an example, the HMD system 250 may include a coordinate system to track the relative positions of various XR objects and elements in a shared artificial reality environment.

Figure 2C:
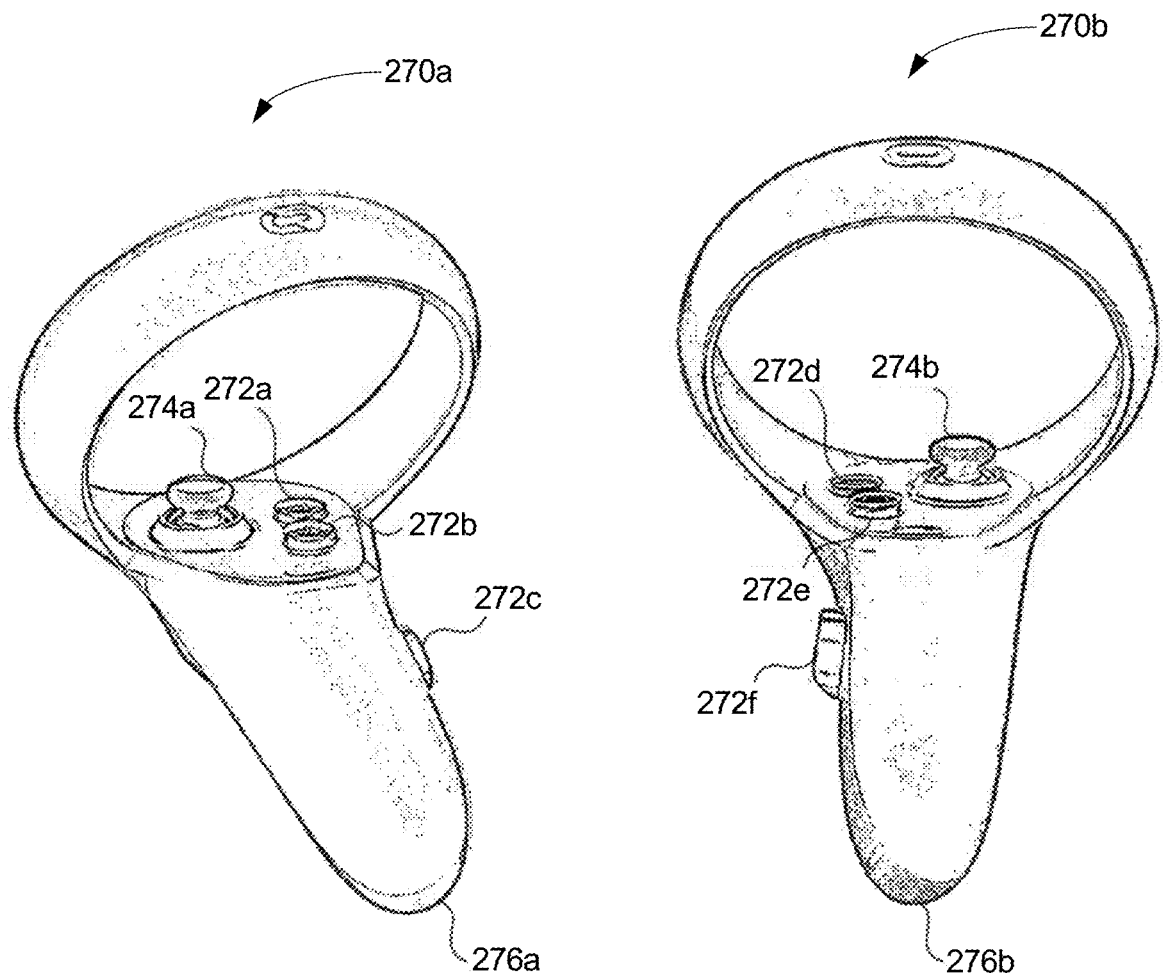
FIG. 2C illustrates controllers that a user can hold in one or both hands to interact with an artificial reality environment presented by the HMD s of FIGS. 2A and 2B, in accordance with one or more implementations.

FIG. 2C illustrates controllers 270a-270b, which, in some implementations, a user can hold in one or both hands to interact with an artificial reality environment presented by the HMD 200 and/or HMD 250. The controllers 270a-270b can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement navigation and scrolling via the hand positions and motions of the user, such as to enable a high fiving motion in XR.

The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as a hand tracking unit, an eye tracking unit, an audio system, various network components, etc. to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. Such camera based hand tracking can be referred to as computer vision, for example. Sensing subsystems of the HMD 200 or 250 can be used to define motion (e.g., user hand/wrist motion) along an axis (e.g., three different axes).

Figure 3:
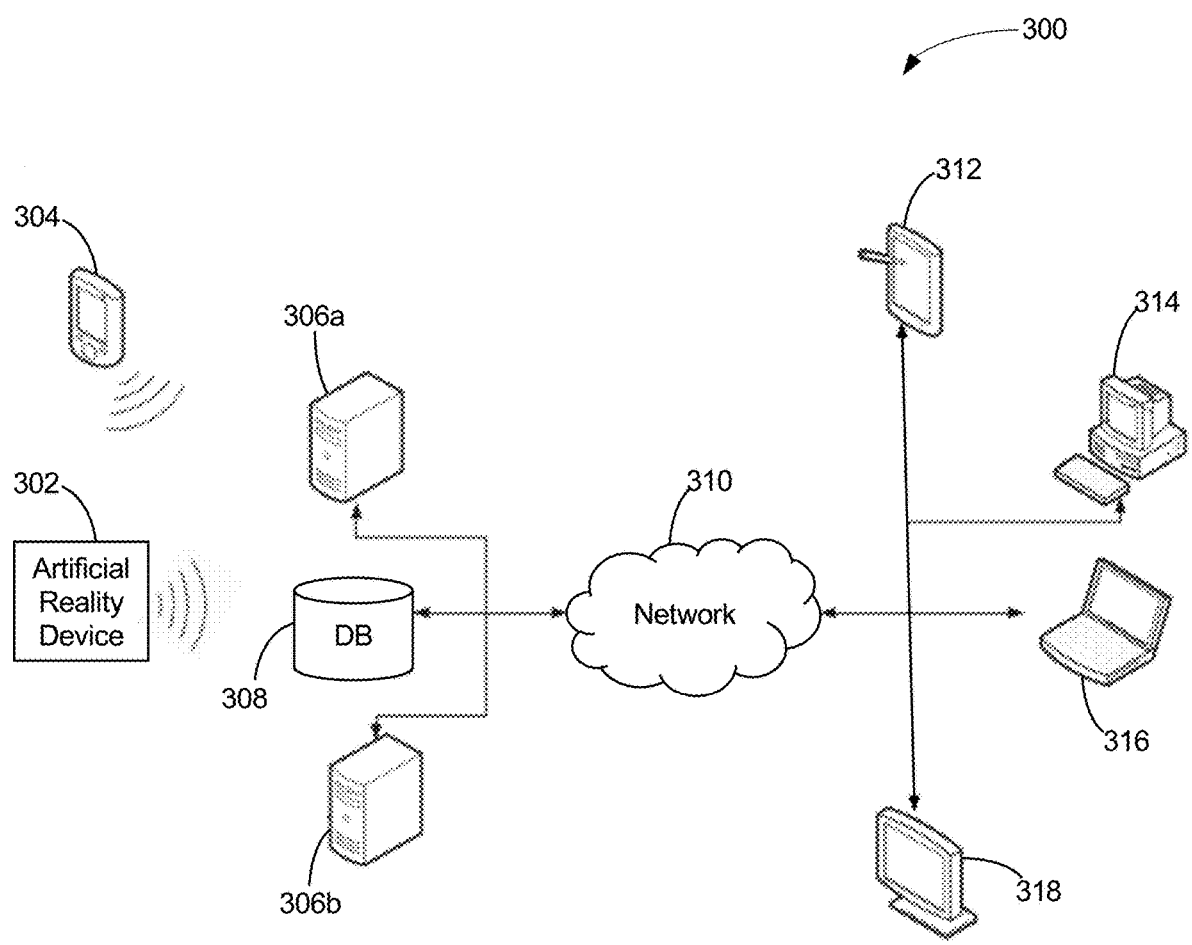
FIG. 3 is a block diagram illustrating an overview of an environment in which some implementations of the disclosed technology can operate.

FIG. 3 is a block diagram illustrating an overview of an environment 300 in which some implementations of the disclosed technology can operate. The environment 300 can include one or more client computing devices, such as artificial reality device 302, mobile device 304 tablet 312, personal computer 314, laptop 316, desktop 318, and/or the like. The artificial reality device 302 may be the HMD 200, HMD system 250, a wrist wearable, or some other XR device that is compatible with rendering or interacting with an artificial reality or virtual reality environment. The artificial reality device 302 and mobile device 304 may communicate wirelessly via the network 310. In some implementations, some of the client computing devices can be the HMD 200 or the HMD system 250. The client computing devices can operate in a networked environment using logical connections through network 310 to one or more remote computers, such as a server computing device.

In some implementations, the environment 300 may include a server such as an edge server which receives client requests and coordinates fulfillment of those requests through other servers. The server may include server computing devices 306a-306b, which may logically form a single server. Alternatively, the server computing devices 306a-306b may each be a distributed computing environment encompassing multiple computing devices located at the same or at geographically disparate physical locations. The client computing devices and server computing devices 306a-306b can each act as a server or client to other server/client device(s).

The server computing devices 306a-306b can connect to a database 308 or can comprise its own memory. Each server computing devices 306a-306b can correspond to a group of servers, and each of these servers can share a database or can have their own database. The database 308 may logically form a single unit or may be part of a distributed computing environment encompassing multiple computing devices that are located within their corresponding server, located at the same, or located at geographically disparate physical locations.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network. In some implementations, the server computing devices 306a-306b can be used as part of a social network such as implemented via the network 310. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Users of artificial reality devices and applications may often desire to share artificial reality objects as part of an interactive experience. However, there may be no easy ways to share such artificial reality objects between two users. In some instances, users may share the artificial reality object within a given immersive application, but the receiver may not be allowed to use the artificial reality object in a different application. Furthermore, when a user discovers an exciting new artificial reality feature, they may lack the capability of transferring or sharing such feature or capability with other users through a messenger application. On standard messenger applications, three-dimensional object or asset sharing may not be supported.

The subject disclosure provides for systems and methods for sharing virtual objects. A user is allowed to share virtual objects with other users. For example, virtual objects may be shared in artificial reality environments through messaging applications.

Implementations described herein address the aforementioned shortcomings and other shortcomings by providing a method for sharing artificial reality objects, features, and/or capabilities between users via a messaging application. A three-dimensional (3D) object or virtual effect may be transmitted from a first user to a second user via messaging. The second user may then download the 3D object into their account and use it across a suite of immersive applications, as an owner. In some implementations, it may include a headset running an artificial reality application and the headset may display physical reality elements mixed with an artificial reality element that illustrates a messaging application running in the headset. These implementations enhance the interactive experience of users by allowing them to share and use artificial reality objects across different applications.

Some implementations may enable sharing of 3D models (e.g., 3D files, 3D virtual objects, etc.) through messaging applications where the user can view the model in a chat thread of the messaging application using their respective device. This may make it easier for users to view 3D files, models, assets, or other virtual objects without requiring other 3D-view specific applications.

Some implementations may enable interactive 3D model viewing and interactions. That may include the user making adjustments to size, orientations, rotate the model, scale the model, etc. As another non-limiting example, the 3D models may include interactive features embedded therein. The models may be displayed to a user using the artificial reality device (e.g., headset, glasses, etc.) for the user to participate in an interactive experience based on the embedded interactive features. For example, when a first users shares a bubbles 3D object with a second user, the second user may download the bubbles 3D model and view/interact with it in the messaging application. By way of non-limiting example, the interactions in artificial reality may include the second user reaching out with their hand and touching the bubbles to cause them to burst and make a water effect (e.g., like a water balloon popping).

In some implementations, the 3D objects may have interactions built into them. For example, a user may have created a series of bubbles that you can pop to disperse in the artificial reality environment. As such, the messaging application may support sharing of 3D objects and other assets as well as supporting interactivity with the shared objects through the messaging application.

Figure 4A:
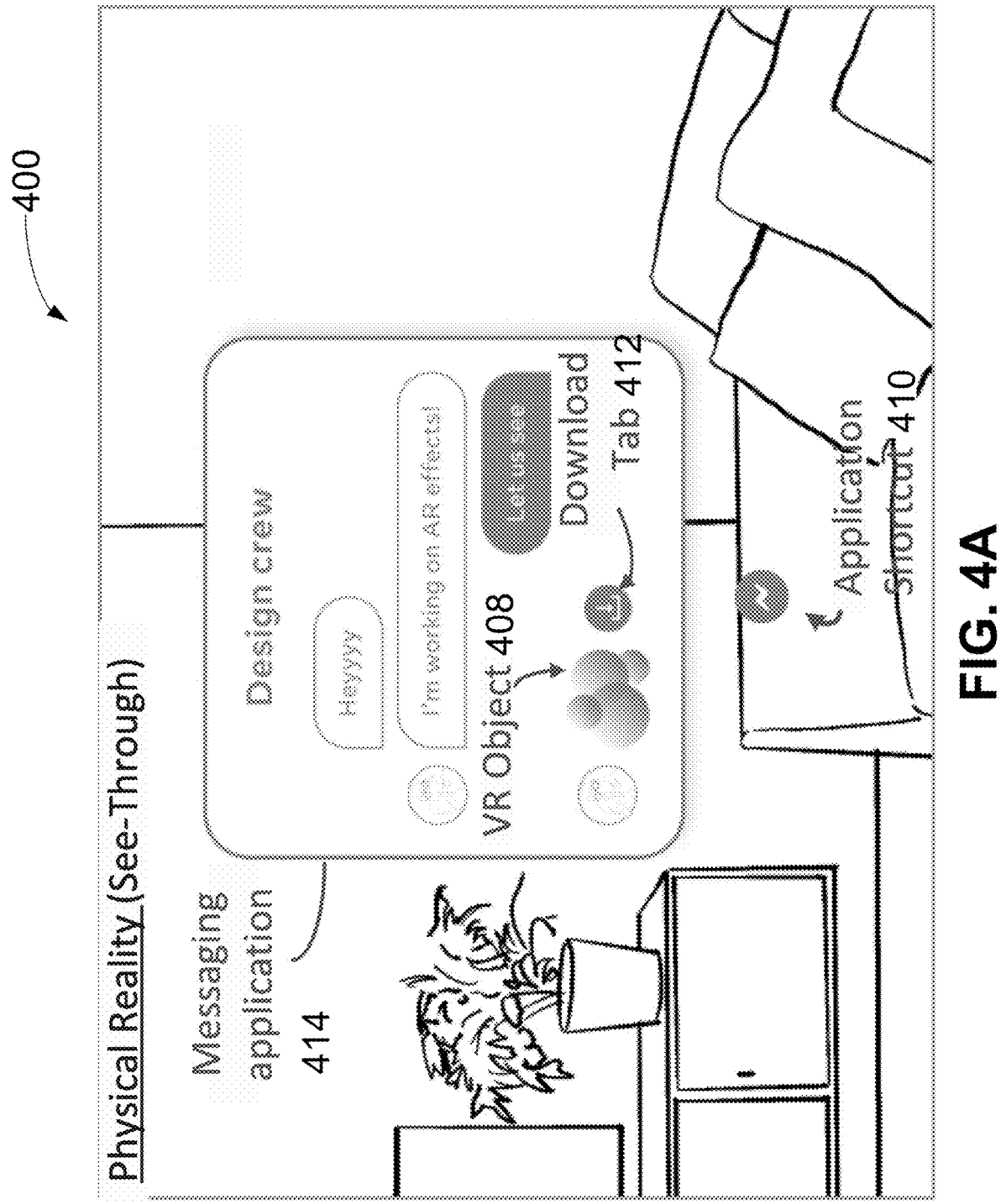
FIGS. 4A and 4B illustrate views of a display of a HMD running an artificial reality application, in accordance with one or more implementations.
Figure 4B:
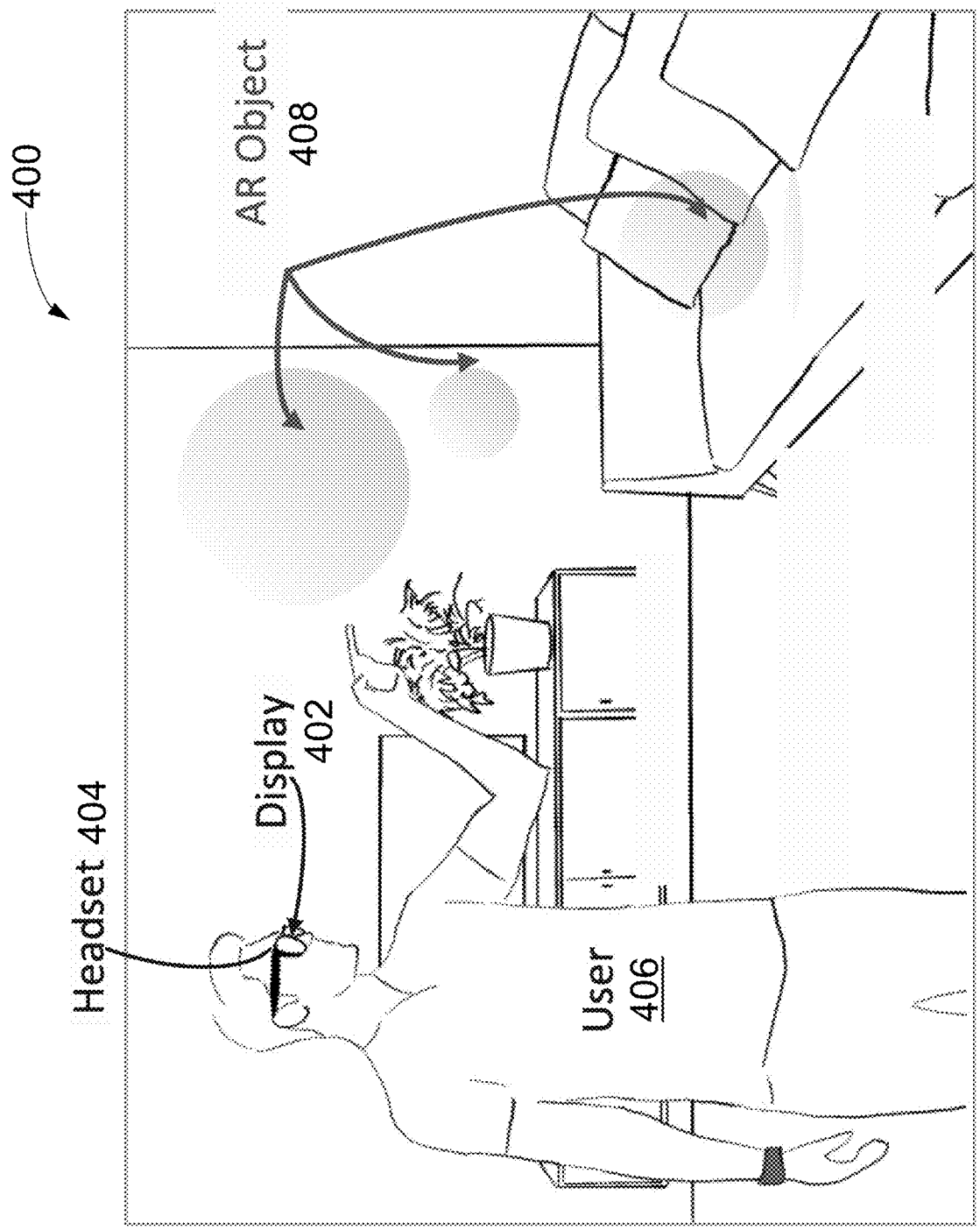

FIGS. 4A and 4B illustrate views 400 of a display (e.g., display 402) of an HMD (e.g., headset 404) running an artificial reality application, in accordance with one or more implementations. In FIG. 4A, a participant user (e.g., user 406) in a chat group, for instance, the "design crew", may have transmitted a virtual object (e.g., AR/VR object 408) to the user. This virtual object may be a 3D model, an interactive game element, or any other digital asset that can be manipulated and viewed within the artificial reality environment. The user, upon receiving this virtual object, may utilize an application shortcut (e.g., application shortcut 410) or an application indicator to activate the chat group. This activation may be achieved through various user interface elements such as icons, buttons, or voice commands, depending on the specific design of the artificial reality application.

Upon activation of the chat group, the user may be presented with an option to download the virtual object. This may be facilitated by a download button (e.g., download tab 412), a drag-and-drop interface, or any other user interface element that allows the user to save the virtual object. Upon clicking on a download button, the virtual object may be saved into the user's personal account. This action may trigger a visual confirmation, an audio cue, or haptic feedback to inform the user that the download has been successful.

A personal account of the user, in which the virtual object may be stored, may be housed in a database. This database may be located on a remote server, a local server, or distributed across multiple servers. The database may be communicatively coupled with the remote server that hosts artificial reality applications for the user, allowing for seamless integration and interaction between the user's personal account and the artificial reality applications.

In some implementations, the personal account for the user may be a network resource that can be accessed by one or more servers hosting artificial reality applications. These servers may be in communication with the HMD, a mobile device, a desktop computer, or any other device that is communicatively coupled with the HMD. This may allow for a flexible and robust system where the user's personal account and the virtual objects contained within it can be accessed and manipulated across multiple devices and platforms, enhancing the user's experience and interaction with the artificial reality environment.

In FIG. 4B, the user may have decided to import the virtual object that was provided by a participant in a messaging application (e.g., messaging application 414). This decision may be prompted by a variety of factors, such as the relevance of the virtual object to the user's current task, the user's interest in the virtual object, or the user's desire to explore and interact with new virtual objects.

Once the virtual object has been imported, the user may be granted an ability to interact with the virtual object in a multitude of ways. For instance, the user may engage in activities such as popping bubbles, adjusting the size, location, and/or orientation of the virtual object, among other possible interactions. These interactions may be facilitated through a variety of user interface elements, such as touch gestures, voice commands, or physical movements that are tracked by the artificial reality system.

Interactions with the virtual object may not be limited to simple manipulations. The user may engage in more complex interactions, such as modifying properties of the virtual object, linking the virtual object with other virtual objects or digital assets, or even programming new behaviors for the virtual object. These interactions may be facilitated through a user interface that is designed to be intuitive and user-friendly, allowing the user to easily understand and control the virtual object.

The virtual object, once imported and interacted with, may be shared with other users, saved for future use, or deleted from the user's personal account. These actions may be performed through a variety of user interface elements, such as buttons, menus, or voice commands.

In some implementations, the virtual object may interact with the user or the artificial reality environment in an autonomous or semi-autonomous manner. For instance, the virtual object may move around the artificial reality environment, react to the user's actions, or change its properties based on certain conditions or triggers. These interactions may provide a more immersive and engaging experience for the user, enhancing the user's enjoyment and satisfaction with the artificial reality system.

The disclosed system(s) address a problem in traditional virtual object sharing techniques tied to computer technology, namely, the technical problem of the inability to share virtual objects (e.g., augmented reality objects or virtual reality objects) or features between users through standard messaging applications. The disclosed system solves this technical problem by providing a solution also rooted in computer technology, namely, by providing for sharing three-dimensional (3D) objects via messaging applications. The disclosed subject technology further provides improvements to the functioning of the computer itself because it improves processing and efficiency in sharing virtual objects.

Figure 5:
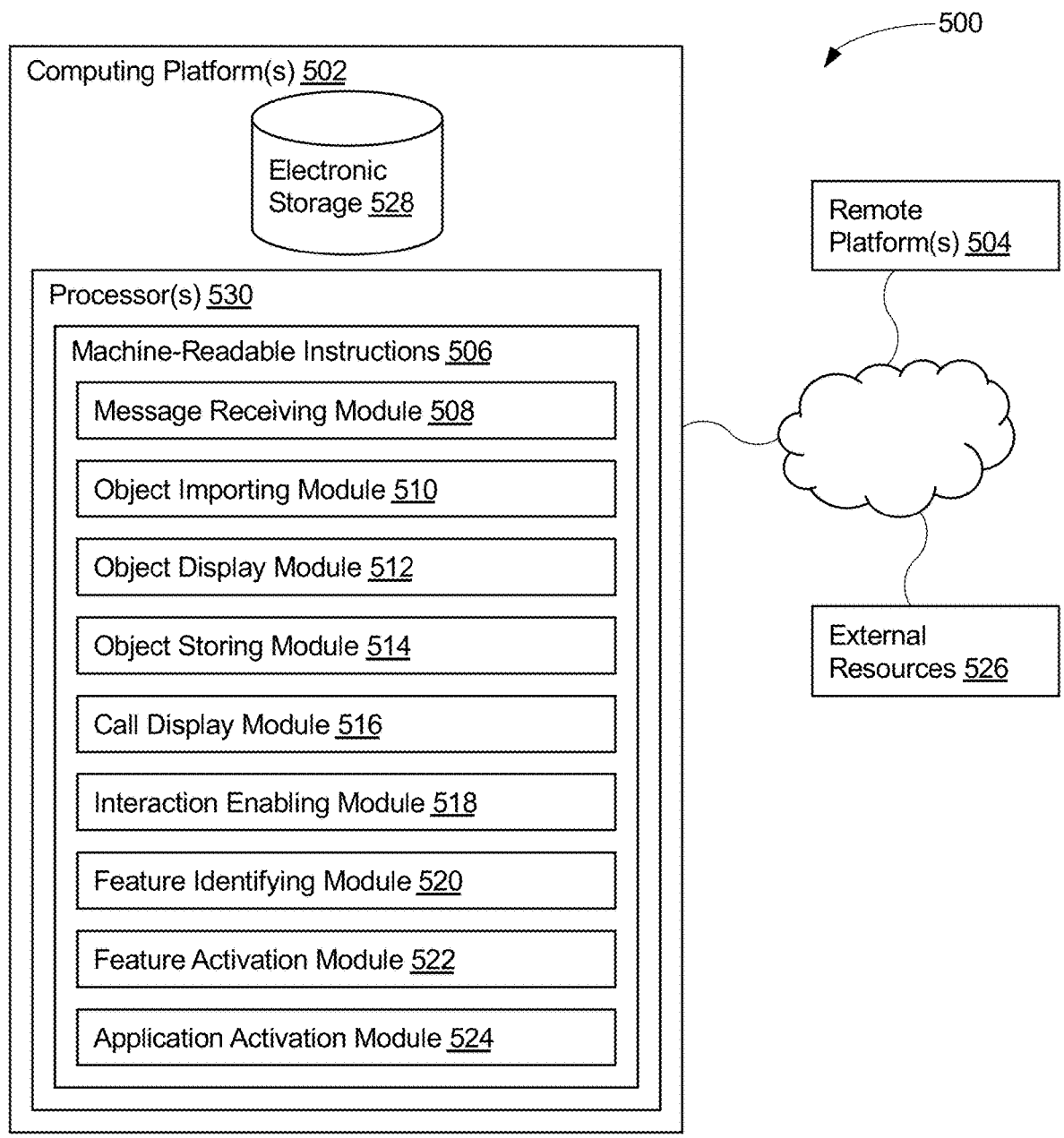
FIG. 5 illustrates a system configured for sharing virtual objects, in accordance with one or more implementations.

FIG. 5 illustrates a system 500 configured for sharing virtual objects, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of message receiving module 508, object importing module 510, object display module 512, object storing module 514, call display module 516, interaction enabling module 518, feature identifying module 520, feature activation module 522, application activation module 524, and/or other instruction modules.

Message receiving module 508 may be configured to receive messages. For example, message receiving module 508 may be configured to receive, at a first device running a messaging application, a message from a second device. The message may include a three-dimensional object. The first device may be head mounted device. The 3D object may be shared through a chat thread of the messaging application. The 3D object may be displayed in the messaging application in a chat thread, allowing users to view the 3D object without requiring other 3D-view specific applications. By way of non-limiting example, the 3D object may be stored at a remote server, the remote server communicating with, retrieving, and uploading datasets onto a database, the datasets including information associated with the immersive application running in the first device, including one or more of 3D objects, web addresses and hyperlinks, and sensor data.

Object importing module 510 may be configured to import the 3D object to a personal account of a user of the first device. The 3D object may include interactive features configured to be activated by the user.

Object display module 512 may be configured to display the 3D object in the messaging application. The user may interact with the 3D object at the first device. Object display module 512 may be configured to display the 3D object in an artificial reality application running in the first device. The user may participate, at the first device, in an interactive artificial reality experience based on the interactive feature.

Object storing module 514 may be configured to store the 3D object at a server associated with the first device.

Call display module 516 may be configured to display a call out from the messaging application indicative of a message receipt. Of a sender of the message.

Interaction enabling module 518 may be configured to enable interactions with the 3D object in an artificial reality environment, interactions including scaling, rotations, and adjustments to orientation. The 3D object may be a series of bubbles that can be interacted with in the artificial reality environment.

Feature identifying module 520 may be configured to identify an interactive feature embedded in the 3D object.

Feature activation module 522 may be configured to activate the interactive feature of the 3D object.

Application activation module 524 may be configured to activate the messaging application at the first device based on a predetermined operation performed. The predetermined operation may include at least one of receiving a selection of an application indicator.

In some implementations, by way of non-limiting example, the 3D object may include one or more of a 3D file, an interactive object, or an artificial reality asset. In some implementations, the 3D object may include embedded interactive features designed to include effects. In some implementations, the 3D object may be viewed and interacted with in an artificial reality environment that includes both virtual objects and real objects.

In some implementations, computing platform(s) 502, remote platform(s) 504, and/or external resources 526 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 526 may be operatively linked via some other communication media.

A given remote platform 504 may include one or more processors configured to execute computer program modules. The computer program modules may be configured to enable an expert or user associated with the given remote platform 504 to interface with system 500 and/or external resources 526, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 526 may include sources of information outside of system 500, external entities participating with system 500, and/or other resources. In some implementations, some or all of the functionality attributed herein to external resources 526 may be provided by resources included in system 500.

Computing platform(s) 502 may include electronic storage 528, one or more processors 530, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 528 may comprise non-transitory storage media that electronically stores information. The electronic storage media of electronic storage 528 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 528 may include one or more of optically readable storage media (e.g., optical disks, etc.), magnetically readable storage media (e.g., magnetic tape, magnetic hard drive, floppy drive, etc.), electrical charge-based storage media (e.g., Electrically Erasable Programmable Read-Only Memory (EEPROM), RAM, etc.), solid-state storage media (e.g., flash drive, etc.), and/or other electronically readable storage media. Electronic storage 528 may include one or more virtual storage resources (e.g., cloud storage, a virtual private network, and/or other virtual storage resources). Electronic storage 528 may store software algorithms, information determined by processor(s) 530, information received from computing platform(s) 502, information received from remote platform(s) 504, and/or other information that enables computing platform(s) 502 to function as described herein.

Processor(s) 530 may be configured to provide information processing capabilities in computing platform(s) 502. As such, processor(s) 530 may include one or more of a digital processor, an analog processor, a digital circuit designed to process information, an analog circuit designed to process information, a state machine, and/or other mechanisms for electronically processing information. Although processor(s) 530 is shown in FIG. 5 as a single entity, this is for illustrative purposes only. In some implementations, processor(s) 530 may include a plurality of processing units. These processing units may be physically located within the same device, or processor(s) 530 may represent processing functionality of a plurality of devices operating in coordination. Processor(s) 530 may be configured to execute modules 508, 510, 512, 514, 516, 518, 520, 522, and/or 524, and/or other modules. Processor(s) 530 may be configured to execute modules 508, 510, 512, 514, 516, 518, 520, 522, and/or 524, and/or other modules by software; hardware; firmware; some combination of software, hardware, and/or firmware; and/or other mechanisms for configuring processing capabilities on processor(s) 530. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, and/or 524 are illustrated in FIG. 5 as being implemented within a single processing unit, in implementations in which processor(s) 530 includes multiple processing units, one or more of modules 508, 510, 512, 514, 516, 518, 520, 522, and/or 524 may be implemented remotely from the other modules. The description of the functionality provided by the different modules 508, 510, 512, 514, 516, 518, 520, 522, and/or 524 described below is for illustrative purposes, and is not intended to be limiting, as any of modules 508, 510, 512, 514, 516, 518, 520, 522, and/or 524 may provide more or less functionality than is described. For example, one or more of modules 508, 510, 512, 514, 516, 518, 520, 522, and/or 524 may be eliminated, and some or all of its functionality may be provided by other ones of modules 508, 510, 512, 514, 516, 518, 520, 522, and/or 524. As another example, processor(s) 530 may be configured to execute one or more additional modules that may perform some or all of the functionality attributed below to one of modules 508, 510, 512, 514, 516, 518, 520, 522, and/or 524.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
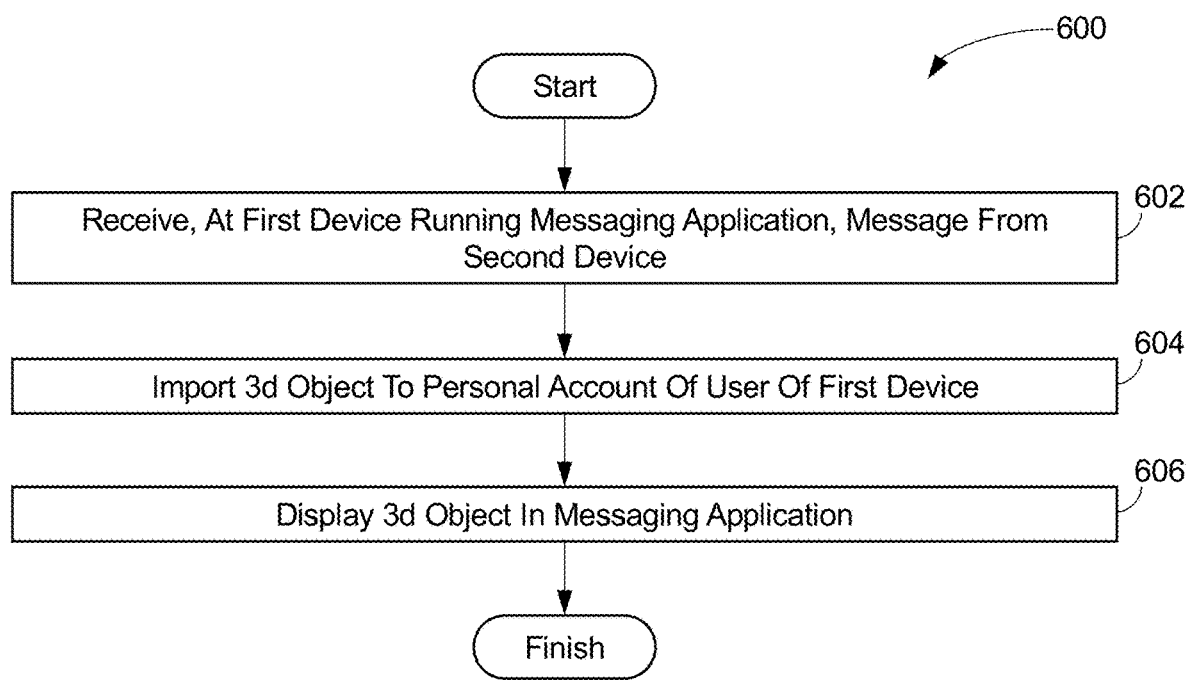
FIG. 6 illustrates an example flow diagram for sharing virtual objects, according to certain aspects of the disclosure.

FIG. 6 illustrates an example flow diagram (e.g., process 600) for sharing virtual objects, according to certain aspects of the disclosure. For explanatory purposes, the example process 600 is described herein with reference to FIGS. 1-5. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-5.

At step 602, the process 600 may include receiving, at a first device running a messaging application, a message from a second device. The message may include a three-dimensional object. At step 604, the process 600 may include importing the 3D object to a personal account of a user of the first device. At step 606, the process 600 may include displaying the 3D object in the messaging application. The user may interact with the 3D object at the first device.

For example, as described above in relation to FIG. 5, at step 602, the process 600 may include receiving, at a first device running a messaging application, a message from a second device. The message may include a three-dimensional object, through message receiving module 508. At step 604, the process 600 may include importing the 3D object to a personal account of a user of the first device, through object importing module 510. At step 606, the process 600 may include displaying the 3D object in the messaging application, through object display module 512. The user may interact with the 3D object at the first device.

According to an aspect, the first device is head mounted device (HMD).

According to an aspect, the 3D object includes one or more of a 3D file, an interactive object, or an artificial reality asset.

According to an aspect, the process 600 may include storing the 3D object at a server associated with the first device.

According to an aspect, the process 600 may include displaying a call out from the messaging application indicative of a message receipt, and of a sender of the message.

According to an aspect, the process 600 may include enabling interactions with the 3D object in an artificial reality environment, interactions including scaling, rotations, and adjustments to orientation.

According to an aspect, the process 600 may include identifying an interactive feature embedded in the 3D object; activating the interactive feature of the 3D object; and displaying the 3D object in an artificial reality application running in the first device, wherein the user participates, at the first device, in an interactive artificial reality experience based on the interactive feature.

According to an aspect, the process 600 may include activating the messaging application at the first device based on a predetermined operation performed, the predetermined operation including at least one of (i) receiving a selection of an application indicator, and (ii) receiving the message.

According to an aspect, the 3D object is shared through a chat thread of the messaging application.

According to an aspect, the 3D object includes embedded interactive features designed to include effects.

According to an aspect, the 3D object includes interactive features configured to be activated by the user.

According to an aspect, the 3D object is displayed in the messaging application in a chat thread, allowing users to view the 3D object without requiring other 3D-view specific applications.

According to an aspect, the 3D object is a series of bubbles that can be interacted with in the artificial reality environment.

According to an aspect, the 3D object is viewed and interacted with in an artificial reality environment that includes both virtual objects and real objects.

According to an aspect, the 3D object is stored at a remote server, the remote server communicating with, retrieving, and uploading datasets onto a database, the datasets including information associated with the immersive application running in the first device, including one or more of 3D objects, web addresses and hyperlinks, and sensor data.

Figure 7:
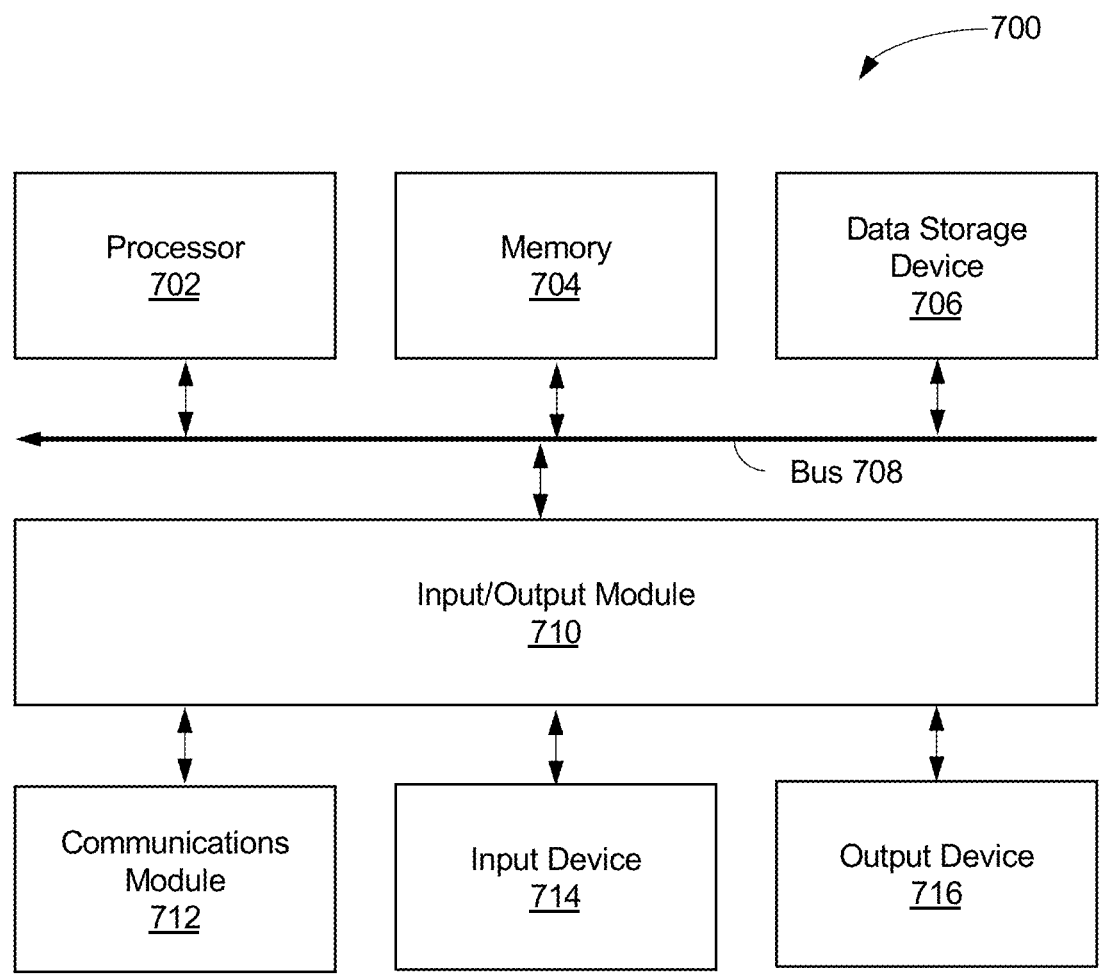
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method, the method comprising:
receiving, at a first device running a messaging application, a message from a second device, the message including a 3D object;
identifying an interactive feature in the 3D object;
activating the interactive feature of the 3D object;
displaying the 3D object in an artificial reality application running in the first device, and
while the 3D object is displayed in the artificial reality application, responding to user interactions with the 3D object using the first device in an interactive artificial reality experience according to the interactive feature.

2. The method of claim 1, wherein the first device is a head mounted device (HMD).

3. The method of claim 1, further comprising:
while the 3D object is displayed in the artificial reality application running in the first device, detecting a user interaction with the interactive feature of the 3D object, wherein the user interaction causes a modification to the 3D object to produce a modified 3D object; and
responsive to another user input, causing the modified 3D object to be sent to another device, different than the first device.

4. The method of claim 3, wherein:
the user interaction causes an adjustment to one or more of a size, a location, and/or an orientation of the 3D object.

5. The method of claim 1, further comprising displaying a call out from the messaging application indicative of a message receipt and a sender of the message.

6. The method of claim 1, further comprising in accordance with activating the 3D object, enabling interactions with the 3D object in the artificial reality application, the interactions including scaling, rotations, and adjustments to orientation of the 3D object.

7. The method of claim 1, further comprising:
displaying the 3D object in a different artificial reality application running in the first device, different than the artificial reality application; and
while the 3D object is displayed in the different artificial reality application, responding to other user interactions with the 3D object using the first device in another interactive artificial reality experience according to a different interactive feature.

8. The method of claim 1, wherein the 3D object is shared through a chat thread of the messaging application.

9. The method of claim 1, wherein the interactive feature includes embedded interactive features designed to include autonomous interactive effects.

10. A system, comprising:
one or more hardware processors configured by machine-readable instructions to:
receive, at a first device running a messaging application, a message from a second device, the message including a 3D object;
identify an interactive feature in the 3D object;
activate the interactive feature of the 3D object;
display the 3D object in an artificial reality application running in the first device, and
while the 3D object is displayed in the artificial reality application, responding to interactions with the 3D object using the first device in an interactive artificial reality experience according to the interactive feature.

11. The system of claim 10, wherein the first device is a head mounted device (HMD).

12. The system of claim 10, wherein the one or more hardware processors are further configured by machine-readable instructions to:
while the 3D object is being displayed in the artificial reality application running in the first device, detecting a user input to interact with the interactive feature of the 3D object, wherein the interactive feature causes a modification to the 3D object; and
responsive to another user input, causing the modified 3D object to be sent to another device, different than the first device.

13. The system of claim 12, wherein:
the user input causes an adjustment to one or more of a size, a location, and/or an orientation of the 3D object.

14. The system of claim 10, wherein the one or more hardware processors are further configured by machine-readable instructions to display a call out from the messaging application indicative of a message receipt and a sender of the message.

15. The system of claim 10, wherein the one or more hardware processors are further configured by machine-readable instructions to, in accordance with activating the 3D object enable interactions with the 3D object in the artificial reality application, the interactions including scaling, rotations, and adjustments to orientation of the 3D object.

16. The system of claim 10, wherein the one or more hardware processors are further configured by machine-readable instructions to:
displaying the 3D object in a different artificial reality application running in the first device, different than the artificial reality application; and
while the 3D object is displayed in the different artificial reality application, responding to other user interactions with the 3D object using the first device in another interactive artificial reality experience according to a different interactive feature.

17. The system of claim 10, wherein the 3D object is shared through a chat thread of the messaging application, and the 3D object includes embedded interactive features designed to include autonomous interactive effects.

18. A non-transient computer-readable storage medium having instructions embodied thereon, the instructions being executable by one or more processors to perform a method, the method comprising:

activating a messaging application at a first device based on a predetermined operation performed, the predetermined operation including at least one of receiving a selection of an application indicator;

receiving, at the first device running the messaging application, a message from a second device, the message including a 3D object;

identifying an interactive feature in the 3D object;

activating the interactive feature of the 3D object;

displaying the 3D object in an artificial reality application running in the first device; and while the 3D object is displayed in the artificial reality application, responding to: interactions with the 3D object using the first device in an interactive artificial reality experience according to the interactive feature.

19. The system of claim 10, wherein the one or more hardware processors are further configured by machine-readable instructions to:

import, from a personal account associated with the first device, the 3D object into an augmented reality application at the first device.

* * * * *